United States Patent
Gerbert

[15] 3,692,442
[45] Sept. 19, 1972

[54] APPARATUS FOR THE SIMULTANEOUS INJECTION OF A FOAMING PLASTIC RESIN IN A PLURALITY OF LOCATIONS

[72] Inventor: Victor L. Gerbert, Rua Gurindibia 162, Apt. #104, Rio de Janeiro, Brazil

[22] Filed: Nov. 23, 1970

[21] Appl. No.: 91,623

[52] U.S. Cl. ..................... 425/4, 425/225, 425/245
[51] Int. Cl. ............................................. B29d 27/04
[58] Field of Search .. 18/5 P, 30 AM, 30 AA, 30 AC, 18/30 AF, 30 AH, 30 AP, 30 AR, 30 AS, DIG. 1; 425/4, 225, 245

[56] References Cited

UNITED STATES PATENTS

| | | |
|---|---|---|
| 3,588,953 | 6/1971 | Reuter et al. ................. 18/5 P |
| 3,461,193 | 8/1969 | Gilardi ........................ 18/5 P |
| 3,585,743 | 10/1970 | Stanciu et al. ..... 18/30 AR UX |

*Primary Examiner*—H. A. Kilby, Jr.
*Attorney*—Seed, Berry & Dowrey

[57] ABSTRACT

An apparatus and method are disclosed for simultaneously injecting a reactive mixture consisting of components which form a polyurethane or isocyanurate foam out of a plurality of injection tubes leading from a single mixing vessel into several molds or into one mold having several injection openings. Simplification and cost reduction are two of the main advantages of this invention.

5 Claims, 2 Drawing Figures

APPARATUS FOR THE SIMULTANEOUS INJECTION OF A FOAMING PLASTIC RESIN IN A PLURALITY OF LOCATIONS

BACKGROUND OF THE INVENTION

1. Field of the Invention

This invention relates to equipment and to a method for simultaneously injecting a reactive mixture which forms a plastic foam into a plurality of molds or into one mold having several different injection openings.

2. Prior Art Relating to the Disclosure

Polyurethane foams, either soft, semi-rigid or rigid, are prepared from four basic ingredients:

1. Resin containing two or more hydroxyl groups per molecule.
2. Isocyanate or diisocyanate
3. Catalyst or catalysts
4. Blowing agents (as water, monofluortrichloromethane, etc.).

Polyisocyanurate foams, on the other hand, are prepared from isocyanates, catalysts and blowing agents by trimerization. To the ingredients may also be added other additives to control the course of the reaction, to improve the homogeniety and to control the cell structure of the resultant foam. Such additives may include surfactants, e.g., soluble silicone derivatives, fillers, plasticizers, dyes, or pigments. The components making up the foaming resin must be thoroughly mixed to produce a homogenous mixture in order to obtain optimum cross linking. In addition the reaction mixture must be controlled to obtain an optimum cell structure for the resultant foam. Cells of the foaming resin form around nuclei which consist mainly of air dissolved in the reactive mixture. The quantity and distribution of air determines the characteristics of the foam, that is, whether the foam will have fine cells, coarse cells or irregular cells.

Mixing of the reactive components of a typical polyurethane foam has been accomplished previously either intermittently by hand or mechanical stirrer or continuously by means of metering pumps supplying the components to a mixing head operable either under high or low pressure. Mixing by hand or stirrer is disadvantageous in that a significant amount of the reactive mixture adheres to the vessel and stirrer, reacts there and is lost. The loss is in reverse proportion to the quantity of material mixed; that is, the smaller the quantity of material mixed the larger the proportional loss. Controlled mixing; that is, the controlled formation of cell structure is, for practical purposes, impossible when mixing the components by hand or mechanical stirrer.

When mixing the components on a continuous basis it is necessary that the components enter the mixing chamber or the mixing head at every instant in exact predetermined proportions to obtain a good foam. Pre- or post-flow of either of the components or portion changes thereof during the mixing process result in a deficient foam. Continuous machines generally used operate without loss of material as contrasted with the hand or mechanical stirrer method; however, there are a number of other disadvantages associated with use of the continuous machines. The period of time between mixing of the components and start of the reaction between the components is known as the "cream time" and is usually short (between 10 to 20 seconds) due to the chemical composition of the chemical compounds normally used. The cream time is often shortened even more by the addition of accelerators to the reactive mixture to decrease the curing time of the resins and thereby effect a higher output. It is a basic requirement in the production of polyurethane foams that no fresh mixture be introduced into the already reacting mixture after the cream time. If fresh components are introduced the foam cells burst and pockets appear therein, resulting in a foam of deficient properties. The cream time and the capacity of the foaming machine thus determine the maximum amounts of reactive mixture which can be injected into a mold or molds at any given time. If large articles are to be produced by injecting the reactive foaming resin into a mold in a time period of a few seconds (cream time) only very large and expensive machines of high capacity can be employed. These machines, however, are generally not capable of producing small pieces. Thus, if a manufacturer wants to produce articles of very different volumes the only solution to date has been to utilize machines with varying capacities.

Present production of polyurethane foam is carried out either with very large slab-machines having outputs up to 800 lbs. per minute or machines constructed to foam into molds. The slab machines pour a reactive mixture on a moving conveyor belt to form a continuous slab generally about 2 yards wide, 23 to 30 inches high and as long as desired. Such machines utilize metering pumps which bring the reactive components together in a mixing head, the mixing head pouring the reactive mixture in a crosswise movement on the conveyor belt where it foams.

The machines designed to foam into molds are also based on metering pumps and utilize a mixing head. They are entirely subject to the aforementioned restriction in that machines with small through-put cannot produce large articles and vice versa.

The process and apparatus of this invention enables a manufacturer of foamed products to utilize one machine for the production of molded articles requiring a high volume output of foaming resin and articles requiring relatively small amounts of foaming resin in that the machine is capable of simultaneous injection of a reactive mixture into a plurality of molds or into one or more relatively large molds having numerous injection openings therein. The machine can also produce buns of elastic foam intermittently whereby bun heights of one yard can easily be obtained in parallelopiped form which gives a higher ratio of first class material.

SUMMARY OF THE INVENTION

This invention relates to an apparatus for injecting predetermined quantities of a reactive mixture simultaneously into a plurality of molds or into a single mold having a plurality of injection openings prior to cure thereof to form a plastic foam. The apparatus comprises a substantially airtight mixing vessel having valved inlet and outlet openings therein for receiving and ejecting the reactive mixture, an agitator mounted in the mixing vessel to mix the reactive components thoroughly and aid in regulation of the cell structure thereof, metering vessels for the essential reactive components of the reactive mixture having outlets communicating with the interior of the mixing vessel, the metering vessels operative to separately and intermittently, individually or in batteries, meter and measure the essential ingredients of the reactive mixture to the mixing vessel, means for regulating the cell structure of the reactive mixture within the mixing vessel, and distribution means for injecting the reactive mixture into a plurality of molds or into a single mold at a plurality of different points. The reactive mixture can be produced in larger quantities and distributed by the distributing head under air pressure into several molds or forms. The loss of material associated with the hand and mechanical stirrer processes is reduced to a minimum by distributing the loss ratio over a larger number of molds. Employing the apparatus of this invention large quantities of the reactive mixture can be injected into a mold or molds in a short period of time (for example 120 lbs. of reactive material in 2 to 5 seconds). The decided advantage of this machine is that small as well as large quantities can be processed with equal ease, for which purpose more than one conventional machine would normally be required. The apparatus of this invention allows controlled regulation of the cell structure which is dependent on the nuclei buildup in the reactive mixture. The nuclei consist mainly of dissolved air. The nuclei buildup means the number of nuclei existing in the reactive mixture which is dependent on the quantity of air dissolved therein and its distribution by the action of the agitator. The quantity of air dissolved depends primarily on the air pressure in the vessel. The regulation of the air pressure in the vessel together with the control of the action of the agitator by a revolution counter allow the attainment of an optimum cell-structure of reproducible character.

The distributor head of the apparatus of this invention allows the reactive mixture to be injected simultaneously into a plurality of molds in equal as well as different proportions.

The ability to simultaneously inject a reactive mixture in equal quantities from a single mixing vessel enables manufacturing costs to be reduced in the manufacture of foamed core sandwich panels normally produced in multiple presses. Sandwich panels, such as doors, wall panels, or other such articles, used in construction and building trades, are generally foamed in multiple presses with each of the panels foamed in sequence and not simultaneously. Each partition of the press must withstand the entire foam pressure of the individual panel when the panels are foamed in sequence, otherwise deformation occurs. If all of the panels in the multiple press are injected with the reactive mixture simultaneously as can be done with the apparatus of this invention, the intermediate partitions of the multiple press (but not the outside walls) can be very light construction due to the compensation of pressures of the foam which surge simultaneously into every partition. Hence, it is an object of this invention to provide a means of injecting a reactive mixture simultaneously in equal quantities into congruent and symmetrically placed compartments or molds.

The expansion of the foaming resin is hindered in the production of large or complicated foamed articles, particularly those fabricated with foamed-in expanded clay or glass particles, due to friction. Simultaneous injection into such molds at a number of different locations using the equipment of this invention overcomes this difficulty and allows the manufacture of pieces of large volume or complicated form.

The machine of this invention is very advantageous in the intermittent manufacture of soft foam buns for the following reasons: (1) The metering system to be described is simple but very exact; (2) The reactive mixture in the mixing vessel can be ejected from the mixing vessel under air pressure almost instantaneously; (3) Nuclei buildup can be controlled with exactness; (4) Corrections or changes to the formulation of the reactive mixture can be easily accomplished without necessity of cleaning the entire machine; and (5) In the manufacture of soft foam in buns the ejection of the mixture in parallel strips into a moving bun formed under low pressure by means of the distributor head of this invention facilitates good distribution of the reactive mixture.

In addition to the advantages pointed out above, the machine of this invention can be manufactured more economically and kept in operation by two men producing 6–8 tons of foam per day as compared to the large continuous slab machines referred to previously.

DESCRIPTION OF THE PREFERRED EMBODIMENT

Figure 1:
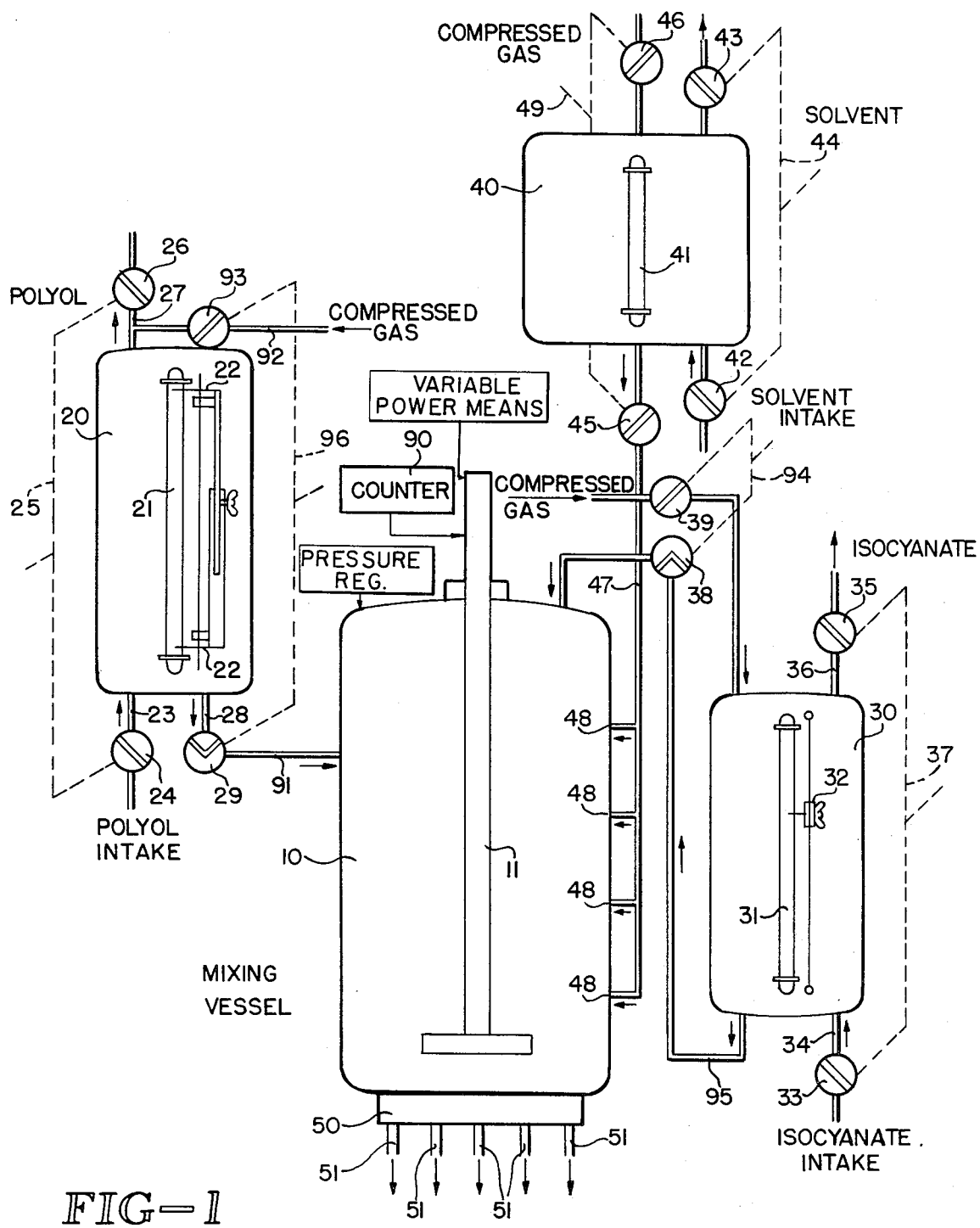
FIG. 1 is a schematic representation of the overall system for plural injection of foamed materials.

Referring to FIG. 1, the overall system of this invention includes a mixing vessel 10 and three or more separate vessels 20, 30 and 40 connected with the main vessel by suitable conduits. The mixing and metering apparatus of this invention is primarily useful in the mixing and distribution of the reactive mixture for production of cellular urethane plastics, consisting of a resin containing two or more hydroxyl groups per molecule which reacts with an isocyanate. Additives may be added to the polyol component or isocyanate component to control or vary the properties of the end product. Referring to FIG. 1 vessel 20 contains the polyol component with or without additives. Vessel 30 contains the isocyanate component. Vessel 40 contains a cleaning solvent. If it is desired to meter additives directly into the mixing vessel rather than mixing the additives into the polyol component, additional vessels may be provided with suitable conduits for metering the additives into the mixing vessel directly or by collector tubes when the metering vessels are joined in batteries.

Figure 2:
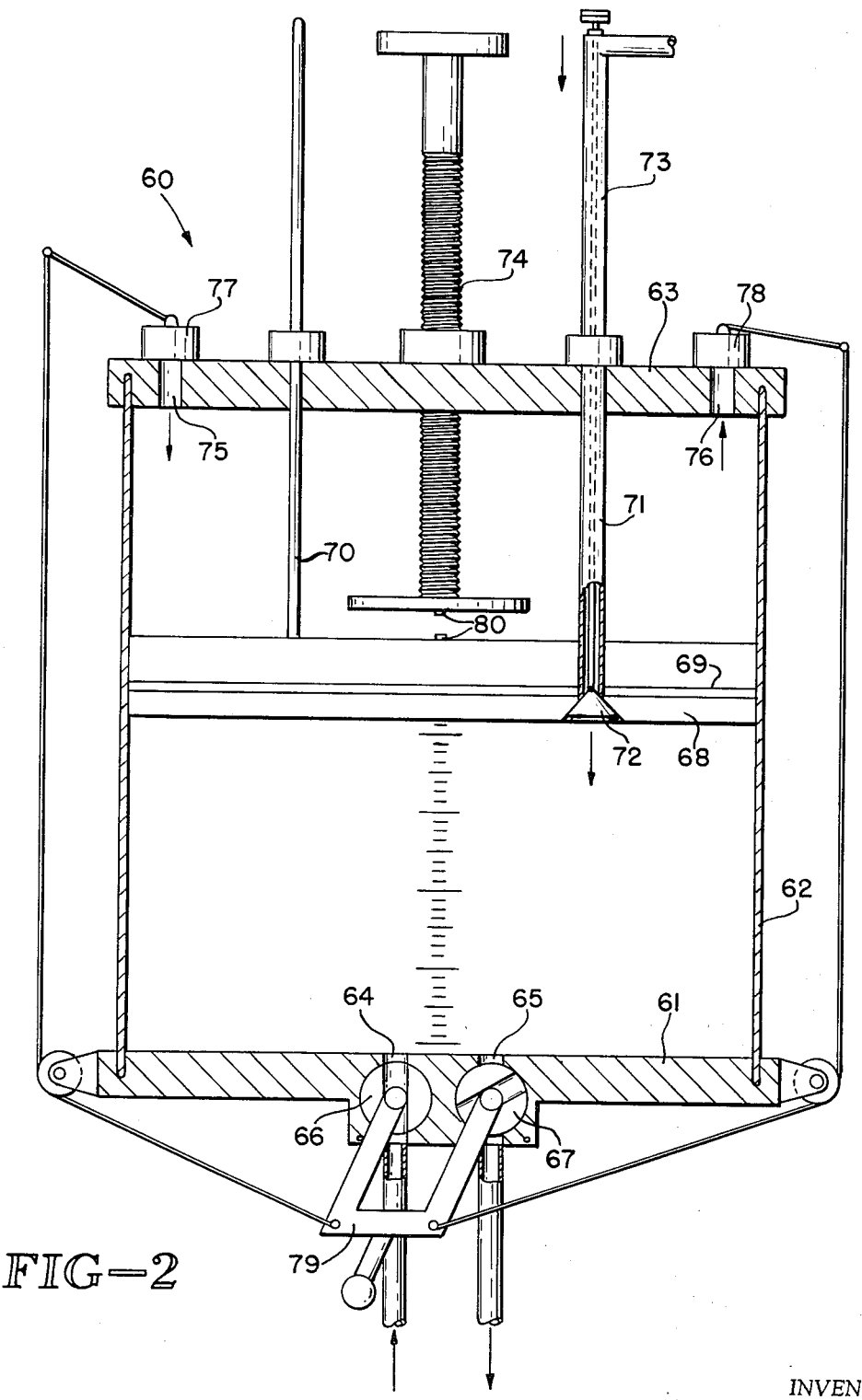
FIG. 2 is a cross-sectional view of a modified form of metering vessel which may be used to meter one or more of the components making up the foaming reactive mixture.

The metering vessels 20 and 30 and those of the additives, if any, are designed to deliver predetermined quantities of the materials either mechanically or manually. FIG. 2 illustrates a substantially airtight metering vessel 60 having a bottom wall 61, side wall 62 and top wall 63. A material inlet opening 64 and material outlet opening 65 are provided in the bottom wall, opening and closing of the inlet and outlet openings controlled by valves 66 and 67 respectively. The valves are connected such that when the material inlet valve is open the material outlet valve is closed and vice versa. A floating piston 68 having a sealing ring 69 therearound is positioned within the vessel 60 for vertical movement. Guide rods 70 and 71 extend from the upper surface of the piston upwardly through the top wall 63 of the vessel 60. Guide rod 71 may be made hollow and extended through piston 68 and a check valve 72 operated by rod 73 inserted therein. The height to which the piston 68 may be raised by intake of material is controlled by an adjustable screw 74 extending through the top 63 of vessel 18. Openings 75 and 76 are provided in the top of vessel 60, these openings covered by air control valves 77 and 78 respectively. The air valves are directly connected to a lever 79 which also connects material control valves 66 and 67. When lever 79 is in the position shown in FIG. 2 air valve 78 is open to the atmosphere and material under pressure enters through material inlet opening 64 into the interior of the vessel. The pressure of the material entering the vessel raises piston 68 until it reaches the height of the adjustable blocking screw 74. An electrical contact 80 operatively connected to lever 79 may be provided either on the bottom surface of the screw or the top surface of the piston so that when the piston contacts the bottom surface of the blocking screw it shifts lever 79 to the right closing the material inlet opening 64 and opening the material outlet opening 65. At the same time air valve 78 is closed and air valve 77 is opened allowing compressed air to enter the vessel above piston 68. The air pressure ejects the material in the vessel through material outlet opening 65. The amount of material delivered to the mixing vessel can be accurately controlled with a metering vessel of the type shown in FIG. 2.

Metering vessels of the type shown in FIG. 1 also use gas pressure to force the material from the vessel into the mixing vessel. The metering vessels 20, 30 and 40 shown in FIG. 1 are provided with sight glasses 21, 31 and 41 respectively. Pointers 22 and 32 mounted on suitable rails may be used to indicate the amount of material to be metered into the mixing vessel so that exact amounts can be accurately metered into the mixing vessel at different times.

The mixing vessel 10 is equipped with an eccentrically mounted impeller assembly 11 powered by suitable power means. The impeller assembly is operatively connected to a variable speed power means so that the impeller assembly may be run at either low or high speed. The impeller assembly should be capable of mixing at speeds ranging from 1,750 to 3,500 rpm. A revolution counter 90 is operatively connected to the shaft of the impeller assembly 11 to count the number of revolutions the impeller assembly makes during a given material mix.

Secured to the lower or outlet end of the mixing vessel is a distributor head 50 which distributes the reactive mixture into equal parts or unequal parts and delivers the mixture into injection tubes 51 leading to one or more molds. The distributor head, not shown in detail in the drawings, includes a number of identical Teflon lined spherical valves which are turned by shafts. The shafts, in their basic position, are parallel and are fixed to a rail by means of slides. Moving one or more shafts from their original parallel position by means of the slides controls the throughput of material through the corresponding valves. The valves open and shut by the movement of the rail. The rail carries scales indicating the amount of turning of the shafts from their parallel position as a function of the change of the opening of the valves.

OPERATION

Referring to FIG. 1 the polyol vessel 20 is filled with material through inlet opening 23, closing and opening of inlet opening 23 controlled by valve 24 which a lever 25 or other control means is attached. Lever 25 is also attached to blow-off valve 26 which closes and opens outlet 27. When valve 23 is opened valve 26 is also opened. When vessel 20 has been filled to the desired level lever 25 is moved to close both valves 24 and 26.

Metering vessel 30 is filled in a similar manner with an isocyanate component by opening material control valve 33 allowing the material to enter the lower end of vessel 30 through inlet opening 34. A blow-off valve 35 closes and opens outlet opening 36 in the top of the vessel. The control valves 33 and 35 are linked by level 37 or other control means. When the isocyanate component has filled the vessel to the desired level material control valve 33 and blow-off valve 35 are closed.

The solvent vessel 40 may be filled in a similar manner by opening control valve 42 and blow-off 43 linked by lever 44, allowing the vessel to fill with the cleaning solvent to the desired level.

The polyol component is preferably delivered into the mixing vessel before the isocyanate through control valve 29 and line 91 communicating with the interior of the mixing vessel. The polyol is forced out of the metering vessel by compressed dry air entering the vessel above the level of the polyol through line 92 and control valve 93. Lever 96 or other suitable control means is connected to both material outlet control valve 29 and control valve 93 so that when control valve 29 is opened compressed air enters through the top of the vessel and forces the polyol component into the mixing vessel. Once in the mixing vessel the polyol component is homogenized with the impeller a desired amount with or without pressure. The metered isocyanate component is then shot into the mixing vessel by opening material outlet control valve 38 and control valve 39, both controlled by lever 94 or other suitable control. The compressed dry air or gas enters the metering vessel 30 near the top and forces the isocyanate out through conduit 95 and valve 38 into the metering vessel. The impeller is preferably in rotation during entry of the isocyanate component. The impeller can be switched from low to high speed revolution during entry of the isocyanate. After all the isocyanate is transferred into the mixing vessel compressed dry air or gas enters the same through line 95 and raises the pressure therein.

The cellular structure of the foam is controlled (a) by the number of revolutions of the impeller at a certain speed and (b) by the pressure in the mixing vessel during the process. Thus to reproduce the cellular structure of the foam resulting from each mixture it is necessary to note the number of revolutions of counter 90, the speed of the impeller and the air pressure applied to the reactive mixture. When the reactive mixture is suitably mixed the identical spherical valves in the distributor head 50 are opened allowing the reactive mixture to be ejected from the mixing vessel by the gas pressure into the various injection tubes 51. Ejection of the total mixture can be accomplished in a matter of seconds. The injection tubes transfer the material to the various molds or to various injection openings on a single mold. Once all of the material is ejected from the reaction vessel the injection tubes are withdrawn. Cleaning of the remains of the reactive mixture after ejection has been completed can be effected in two ways: (a) by carrying out the mixing process in a disposable mixing bag (e.g., a light polyethylene container) put into the mixing vessel at the beginning of each cycle, (b) or by opening material control valve 45 and control valve 46 (linked by lever 49) to allow a cleaning solvent in solvent vessel 40 to be ejected by compressed gas tangentially through line 47 into the mixing vessel. The solvent is followed by high pressure air or gas. The solvent mixture is ejected from the mixing vessel through the distributor head and ejection tubes. After cleaning the cycle described can be resumed. In case (a) the mixing head must be somewhat modified because only the ejector tubes and the mixing head need to be cleaned with solvent.

With the apparatus of this invention relatively small amounts of material may be mixed and injected into one or more molds, or large amounts of material may be mixed and injected simultaneously into molds of different sizes or into one mold at various positions. Regulation of the cellular structure of the foam is accurately controlled through control of the number of revolutions of the impeller. the speed of the impeller and the air pressure in the mixing vessel. The intermittent metering of the ingredients permits high precision and immediate corrections or alterations of the formulas without loss of material as in the case of the continuous machines where it takes time until the correction "arrives" at the mixing head. If more metering vessels are involved consolidation thereof in batteries with common collection tubes might be advantageous. The individual metering can be made to work simultaneously but independently commanded by the same switch.

The embodiments of the invention in which a particular property of privilege is claimed are defined as follows:

1. An apparatus for injecting predetermined quantities of a foamable reactive mixture simultaneously into a plurality of molds or into a single mold having numerous injection openings therein prior to polymerization of the resin to form a cellular plastic foam, comprising:
   1. A substantially airtight mixing vessel having valved inlet openings for entry of compressed air or inert gas and measured amounts of materials which, when mixed, react and set in a relatively short period of time to a cellular plastic; an opening at the lower end of the mixing vessel; an agitator mounted within the vessel; means for regulating the cellular structure of the foaming reactive mixture within the mixing vessel,
   2. a distribution head secured to the opening of the mixing vessel having identically sized multiple valved orifices therein;
   3. at least two metering vessels for separately and intermittently measuring components of the reactive mixture for delivery to the mixing vessel;
   4. conduits extending between each of the respective metering vessels and the mixing vessel for delivery of the respective materials into the mixing vessel from the metering vessels; and
   5. solvent cleaning means for cleaning the interior of the mixing vessel after discharge of the reactive mixture therefrom, the solvent cleaning means including a substantially airtight solvent vessel, a plurality of ejector heads spaced at intervals along the circumference of the mixing vessel mounted to inject the cleaning solvent tangentially along the inner walls of the mixing vessel, conduit means interconnecting the solvent vessel with the ejector heads, and discharge means utilizing compressed gas to eject the solvent in the solvent vessel through the ejector heads into the mixing vessel to clean the same.

2. The apparatus of claim 1 wherein the means for regulating the cellular structure includes air pressure control means, counter means operatively attached to the agitator for recording the revolutions thereof, and means controlling the speed of revolution of the agitator.

3. The apparatus of claim 1 wherein the metering vessels are substantially airtight and include a floating piston therein, a metering screw effecting exact measurement of the components of the reactive mixture and means operable against the floating piston to force the components of the reactive mixture into the mixing vessel.

4. An apparatus for injecting predetermined quantities of a foamable reactive mixture simultaneously into a plurality of molds or into a single mold having numerous injection openings therein prior to polymerization of the resin to form a cellular plastic foam, comprising:
   1. a substantially airtight mixing vessel having valved inlet openings for entry of compressed air or inert gas and measured amounts of materials which, when mixed, react and set in a relatively short period of time to a cellular plastic; an opening at the lower end of the mixing vessel; an agitator mounted within the vessel; means for regulating the cellular structure of the foaming reactive mixture within the mixing vessel,
   2. a distribution head secured to the opening of the mixing vessel having identically sized multiple valved orifices therein;
   3. at least two substantially airtight metering vessels for separately and intermittently measuring the components of the reactive mixture for delivery to the mixing vessel;
   4. conduits extending between the respective metering vessels and the mixing vessel for delivery of the respective components to the mixing vessel;
   5. component control valves between the respective metering vessels and the mixing vessel;
   6. compressed gas valves controlling entry of compressed gas into the respective metering vessels; and
   7. control means interconnecting the component control and compressed gas valves so that opening of the component control valves to direct flow of the components of the reactive mixture into the mixing vessel opens the compressed gas valves to direct compressed gas into the respective metering vessels to force the reactive mixture components out of the metering vessels into the mixing vessel.

5. The apparatus of claim 4 including solvent cleaning means for cleaning the interior of the mixing vessel after discharge of the reactive mixture therefrom, the solvent cleaning means comprising a substantially airtight solvent vessel, a plurality of ejector heads spaced at intervals along the circumference of the mixing vessel mounted so as to inject cleaning solvent tangentially along the inner walls of the mixing vessel, conduit means interconnecting the solvent vessel with the ejector heads, and discharge means utilizing a compressed gas to eject the solvent from the solvent vessel through the ejector heads into the mixing vessel and clean the same.

* * * * *